United States Patent
Huang et al.

(10) Patent No.: US 11,569,657 B1
(45) Date of Patent: Jan. 31, 2023

(54) PROTECTION CIRCUITS

(71) Applicant: Vanguard International Semiconductor Corporation, Hsinchu (TW)

(72) Inventors: Shao-Chang Huang, Hsinchu (TW); Ching-Ho Li, Hsinchu (TW); Hsien-Feng Liao, Taichung (TW); Chieh-Yao Chuang, Kaohsiung (TW); Yeh-Ning Jou, Hsinchu (TW)

(73) Assignee: Vanguard International Semiconductor Corporation, Hsinchu (TW)

( * ) Notice: Subject to any disclaimer, the term of this patent is extended or adjusted under 35 U.S.C. 154(b) by 0 days.

(21) Appl. No.: 17/519,303

(22) Filed: Nov. 4, 2021

(51) Int. Cl.
*H02H 9/04* (2006.01)
*H02H 1/00* (2006.01)

(52) U.S. Cl.
CPC .......... *H02H 9/045* (2013.01); *H02H 1/0007* (2013.01)

(58) Field of Classification Search
CPC ...... H02H 1/0007; H02H 9/041; H02H 9/043; H02H 9/045; H02H 9/046
See application file for complete search history.

(56) References Cited

U.S. PATENT DOCUMENTS

| | | |
|---|---|---|
| 2008/0158748 A1 | 7/2008 | Kemper |
| 2014/0355157 A1* | 12/2014 | Huang .................. H02H 9/041 361/56 |
| 2018/0248366 A1* | 8/2018 | Wu ....................... H02H 1/0007 |
| 2020/0153241 A1* | 5/2020 | Mathur ................ H01L 27/0285 |
| 2021/0013714 A1* | 1/2021 | Huang ................... H02H 9/046 |
| 2022/0344930 A1* | 10/2022 | Sun ..................... H01L 27/0285 |

FOREIGN PATENT DOCUMENTS

| | | |
|---|---|---|
| TW | 201445700 A | 12/2014 |
| TW | 201832438 A | 9/2018 |
| TW | 202103402 A | 1/2021 |

OTHER PUBLICATIONS

Taiwanese Office Action and Search Report for Taiwanese Application No. 110136981, dated Feb. 17, 2022.

* cited by examiner

*Primary Examiner* — Jared Fureman
*Assistant Examiner* — Nicolas Bellido
(74) *Attorney, Agent, or Firm* — Birch, Stewart, Kolasch & Birch, LLP (57) ABSTRACT

The protection circuit includes a detection circuit and a discharge circuit. The detection circuit is coupled to first and second power bonding pads and detects whether an ESD event or an EOS event occurs at the first power bonding pad. The detection circuit controls a detection voltage on a detection node according to a detection result. The first and second power bonding pads belong to different power domains. The discharge circuit is coupled to the detection node and the first power pad. In response to the ESD event occurring at the first power bonding pad, the discharge circuit provides a discharge path between the first power bonding pad and a ground terminal according to the detection voltage. In response to the EOS event occurring at the first power bonding pad, the detection circuit activates a second discharge path between the first power bonding pad and the ground terminal.

20 Claims, 11 Drawing Sheets

PROTECTION CIRCUITS

BACKGROUND OF THE DISCLOSURE

Field of the Disclosure

The disclosure relates to a protection circuit, and more particularly to a protection circuit for electrostatic discharge and electrical overstress.

Description of the Related Art

With developments in semiconductor manufacture processing, the size of semiconductor components of integrated circuits has been reduced to the sub-micron level to improve the performance and operating speed of the integrated circuits. However, this reduction of the size of components has caused some reliability problems. In particular, for the integrated circuits, the protection against electrostatic discharge (ESD) is seriously affected. When the size of the components is reduced due to advanced processing technologies, the level of protection against electrostatic discharge has also reduced a lot, resulting in a significant reduction in the ESD tolerance of components. Therefore, an electrostatic discharge protection circuit is needed to protect components from being damaged by electrostatic discharge. However, the existing protection circuits for electrostatic discharge do not have the ability to deal with electrical overstress (EOS). Therefore, when an excessive electrical stress occurs on a bonding pad of a protection circuit, the excessive voltage will cause damage to the components in the protection circuit, which results in that the protection circuit loses its ability to protect against electrostatic discharge.

BRIEF SUMMARY OF THE DISCLOSURE

One exemplary embodiment of a protection circuit is provided. The protection circuit has a first power bonding pad and a second power bonding pad. The protection circuit comprises a detection circuit and a discharge circuit. The detection circuit is coupled to the first power bonding pad and the second power bonding pad and configured to detect whether an electrostatic discharge event or an electrical overstress event occurs on the first power bonding pad. The detection circuit controls a detection voltage on a detection node according to a detection result. The first power bonding pad and the second power bonding pad belong to different respective power domains. The discharge circuit is coupled to the detection node and the first power bonding pad. In response to the electrostatic discharge event occurring on the first power bonding pad, the discharge circuit provides a first discharge path between the first power bonding pad and a ground terminal according to the detection voltage. In response to the electrical overstress event occurring on the first power bonding pad, the detection circuit activates a second discharge path between the first power bonding pad and the ground terminal.

Another exemplary embodiment of a protection circuit is provided. The protection circuit comprises a detection circuit and a discharge circuit. The detection circuit comprises a first transistor, a resistive element, and a second transistor. The first transistor has a first terminal coupled to a first power bonding pad, a second terminal coupled to a first node, and a control terminal coupled to a second power bonding pad. The first power bonding pad and the second power bonding pad belong to different respective power domains. The resistive element is coupled between the first node and a ground terminal. The second transistor has a first terminal coupled to a detection node, a second terminal coupled to the ground terminal, and a control terminal coupled to the first node. The discharge circuit is coupled to the detection node and the first power bonding pad and comprises a resistor, a third transistor, a fourth transistor, and a fifth transistor. The resistor is coupled between the first power bonding pad and the detection node. The third transistor has a first terminal coupled to the first power bonding pad, a second terminal coupled to a second node, and a control terminal coupled to the detection node. The fourth transistor has a first terminal coupled to the second node, a second terminal coupled to the ground terminal, and a control terminal coupled to the detection node. The fifth transistor has a first terminal coupled to the first power bonding pad, a second terminal coupled to the ground terminal, and a control terminal coupled to the second node.

A detailed description is given in the following embodiments with reference to the accompanying drawings.

DETAILED DESCRIPTION OF THE DISCLOSURE

Figure 1:
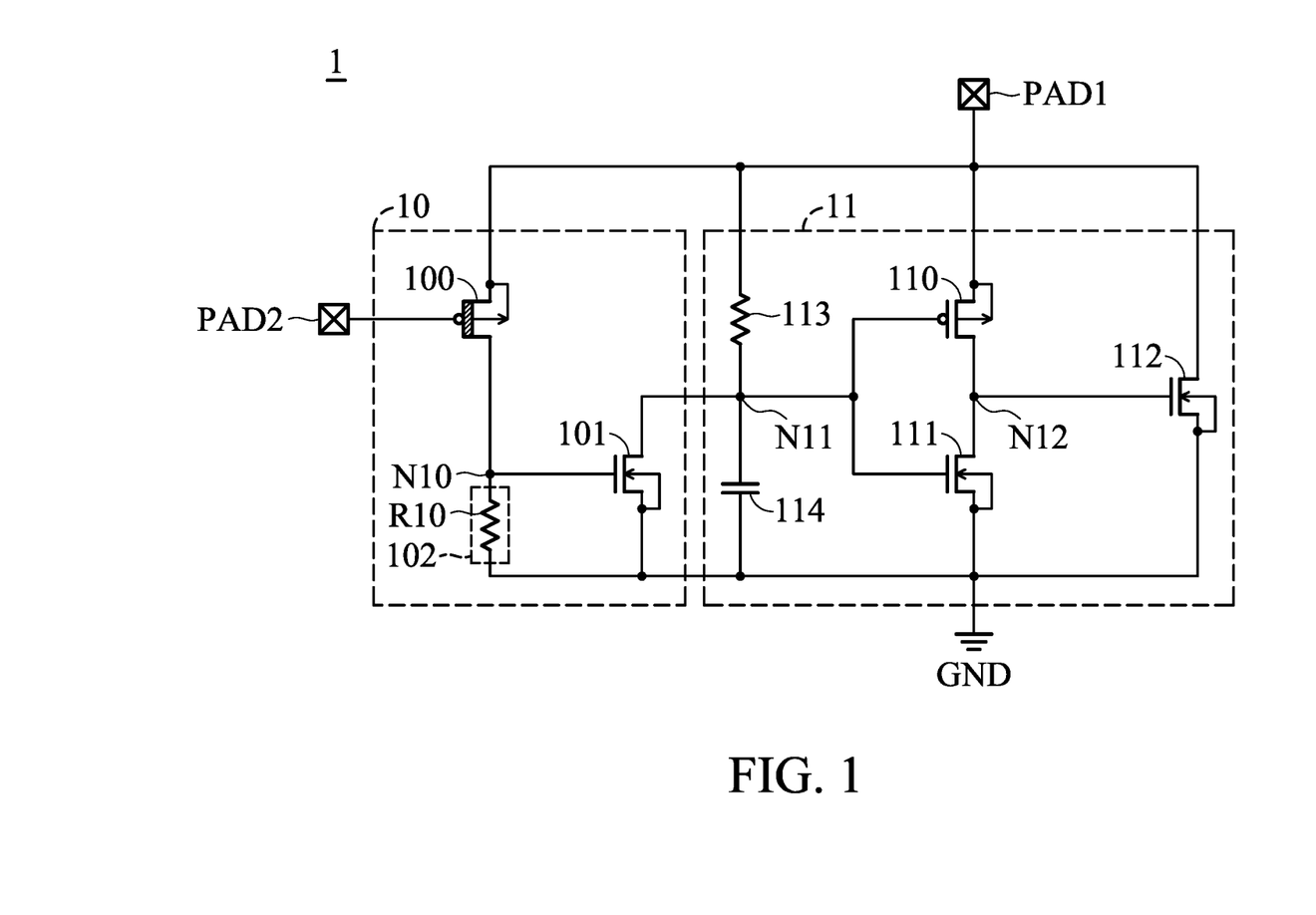
FIG. 1 shows one exemplary embodiment of a protection circuit.

FIG. 1 shows one exemplary embodiment of a protection circuit. Referring to FIG. 1, the protection circuit 1 comprises a detection circuit 10 and a discharge circuit 11. The protection circuit 1 further comprises two power bonding pads PAD1 and PAD2 (referred to as a first power bonding pad PAD1 and a second power bonding pad PAD2). When the protection circuit 1 is in an operation mode, the power bonding pads PAD1 and PAD2 belong to different voltage domains. The power voltages respectively received by the power bonding pads PAD1 and PAD2 will be described in detail later. The detection circuit 10 is coupled to the power bonding pads PAD1 and PAD2. The discharge circuit 11 is coupled to the detection circuit 10 through a detection node N11 and further coupled to the power bonding pad PAD1.

The detection circuit 10 detects whether an electrostatic discharge (ESD) event or an electrical overstress (EOS) event occurs on the power bonding pad PAD1 and controls a detection voltage on the detection node N11 according to a detection result indicating occurrence of an electrostatic discharge event or an electrical overstress event. When an electrostatic discharge event occurs on the power bonding pad PAD1, the discharge circuit 11 provides a discharge path between the power bonding pad PAD1 and the ground terminal GND according to the detection voltage on the detection node N11. When an electrical overstress event occurs on the power bonding pad PAD1, the detection circuit 10 activates at least one discharge path between the power bonding pad PAD1 and the ground terminal GND. According to the embodiment of the present invention, the protection circuit not only provides protection for electrostatic discharge, but also provides protection for electrical overstress. The detailed circuit structure and operation of the protection circuit 1 will be described below.

As shown in FIG. 1, the detection circuit 10 comprises transistors 100 and 101 and a resistive element 102. In the embodiment, the transistor 100 is implemented by a P-type metal-oxide-semiconductor (PMOS) transistor, and the transistor 101 is implemented by an N-type metal-oxide-semiconductor (NMOS). The first terminal (source) of the PMOS transistor 100 is coupled to the power bonding pad PAD1, the second terminal (drain) thereof is coupled to a node N10, and the control terminal (gate) thereof is coupled to the power bonding pad PAD2. The first terminal (drain) of the NMOS transistor 101 is coupled to the detection node N11, the second terminal (source) thereof is coupled to the ground terminal GND, and the control terminal (gate) thereof is coupled to the node N10. In the embodiment, the resistive element 102 comprises a resistor R10. The resistor R10 is coupled between the node N10 and the ground terminal GND.

The discharge circuit 11 comprises transistors 110~112, a resistor 113, and a capacitor 114. The resistor 113 is coupled between the power bonding pad PAD1 and the detection node N11. The capacitor 114 is coupled between the detection node N11 and the ground terminal GND. In the embodiment, the transistor 110 is implemented by PMOS transistors, and the transistors 111 and 112 are implemented by NMOS transistors. The first terminal of the PMOS transistor 110 is coupled to the power bonding pad PAD1, the second terminal thereof is coupled to a node N12, and the control terminal thereof is coupled to the detection node N11. The first terminal of the NMOS transistor 111 is coupled to the node N12, the second terminal thereof is coupled to the ground terminal GND, and the control terminal thereof is coupled to the detection node N11. The first terminal of the NMOS transistor 112 is coupled to the power bonding pad PAD1, the second terminal thereof is coupled to the ground terminal GND, and the control terminal thereof is coupled to the node N12.

In the embodiment of FIG. 1, the thickness of the gate oxide layer of the PMOS transistor 100 is preferably greater than the thickness of the gate oxide layer of the PMOS transistor 110. Therefore, the gates of the PMOS transistors 100 and 110 are represented by different patterns, but the invention is not limited to this. In other embodiments, the thickness of the gate oxide layer of the PMOS transistor 100 may be equal to or less than the thickness of the gate oxide layer of the PMOS transistor 110.

Figure 2:
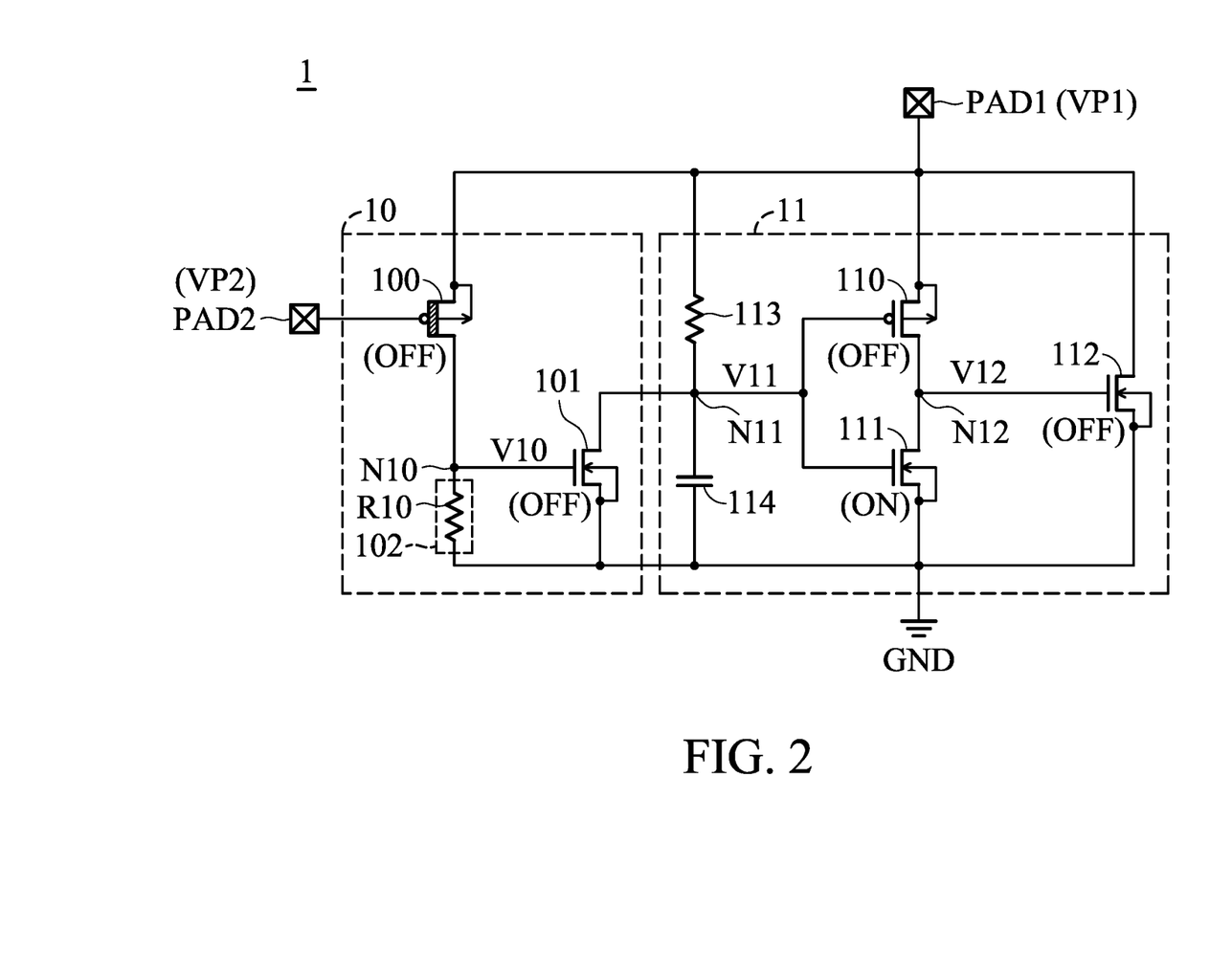
FIG. 2 is a schematic diagram showing a normal operation of the protection circuit of FIG. 1 in an operation mode.

Referring to FIG. 2, when the protection circuit 1 operates normally in the operation mode, an operation voltage is provided to the power bonding pad PAD1, another operation voltage is provided to the power bonding pad PAD2, and there is a ground voltage (for example, 0 volts (V)) on the ground terminal GND. In the embodiment, the operation voltage provided to the power bonding pad PAD2 is greater than or equal to the operation voltage provided to the power bonding pad PAD1. For example, the operation voltage provided to the power bonding pad PAD1 is 18V, and the operation voltage provided to the power bonding pad PAD2 is 24V. Therefore, the voltage VP1 of the power bonding pad PAD1 is 18V, and the voltage VP2 of the power bonding pad PAD2 is 24V.

Figure 4:
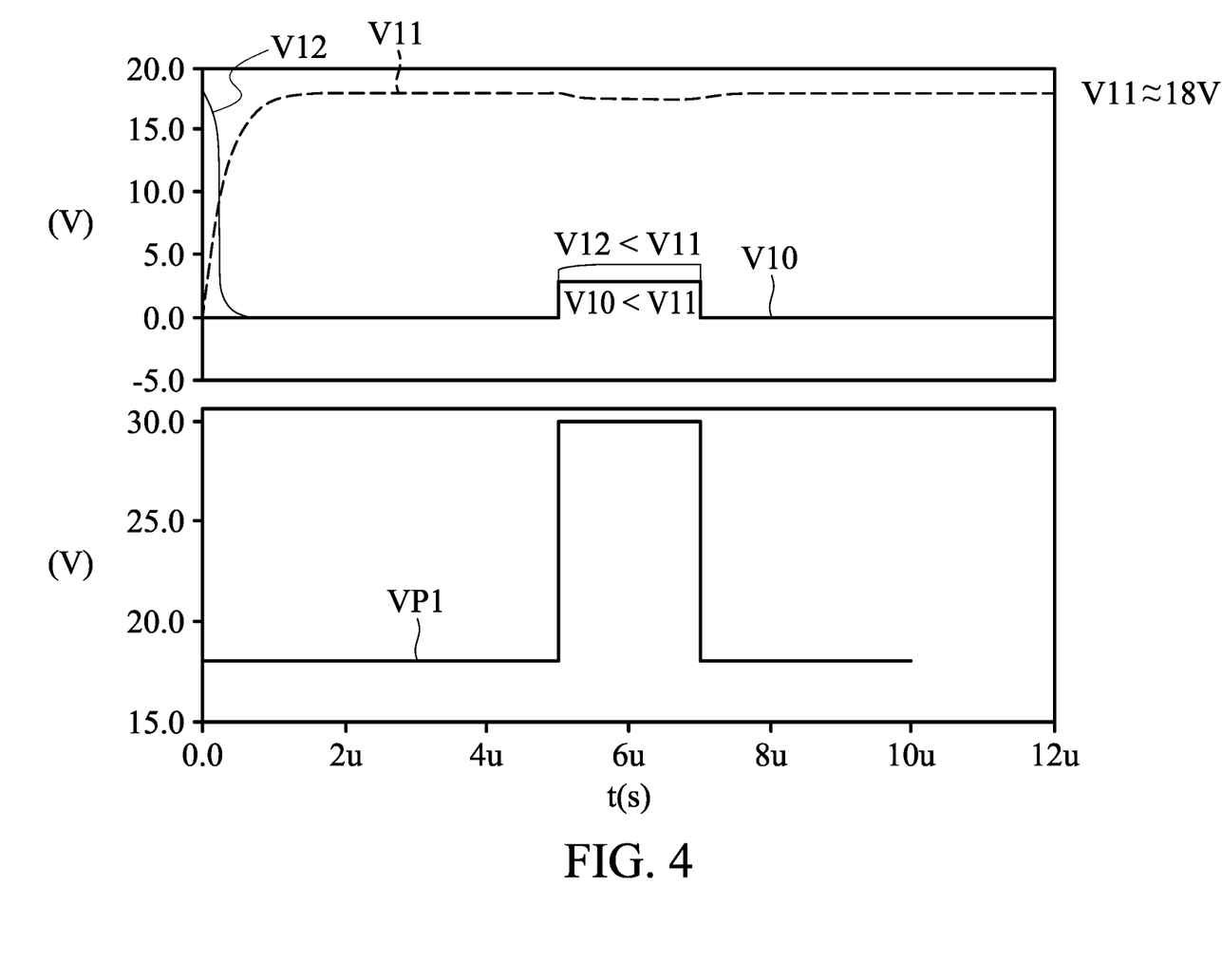
FIG. 4 is a schematic diagram showing main voltages of the protection circuit of FIG. 1 when it suffers an electrical overstress event in an operation mode.

Based on the voltages VP1 and VP2, the PMOS transistor 100 is turned off. In FIG. 2 and subsequent figures, the transistors that are turned off will be marked with "(OFF)". At this time, since the PMOS transistor 100 is turned off and the resistor R10 is coupled to the ground terminal GND, the voltage V10 on the node N10 is at a low level. Referring to FIG. 4, the voltage V10 is approximately on the voltage level (0V) of the ground terminal GND. According to the voltage V10 of 0V, the NMOS transistor 101 is turned off (OFF). Moreover, in response to the voltage VP1, the detection voltage V11 on the detection node N11 is approximately equal to the voltage VP1. For example, referring to FIG. 4, the detection voltage V11 is approximately equal to 18V (V11≈18V). According to the detection voltage V11 which is equal to about 18V, the PMOS transistor 110 is turned off (OFF), and the NMOS transistor 111 is turned on (ON). In FIG. 2 and subsequent figures, the transistors that are turned on will be marked with "(ON)". Since the NMOS transistor 111 is turned on, the voltage V12 on the node N12 is close to or equal to the voltage level (0V) of the ground terminal GND, so that the NMOS transistor 112 is turned off (OFF).

According to the above description, when the protection circuit 1 operates normally in the operation mode, the transistors 100 and 101 of the detection circuit 10 are turned off, so that the detection voltage V11 on the detection node N11 is on a level of about 18V. According to the detection voltage V11, the transistors 110 and 112 of the discharge circuit 11 are both turned off. Therefore, the detection circuit 10 does not provide any circuit path between the power bonding pad PAD1 and the ground terminal GND, and the discharge circuit 11 does not provide any circuit path between the power bonding pad PAD1 and the ground terminal GND.

Figure 3:
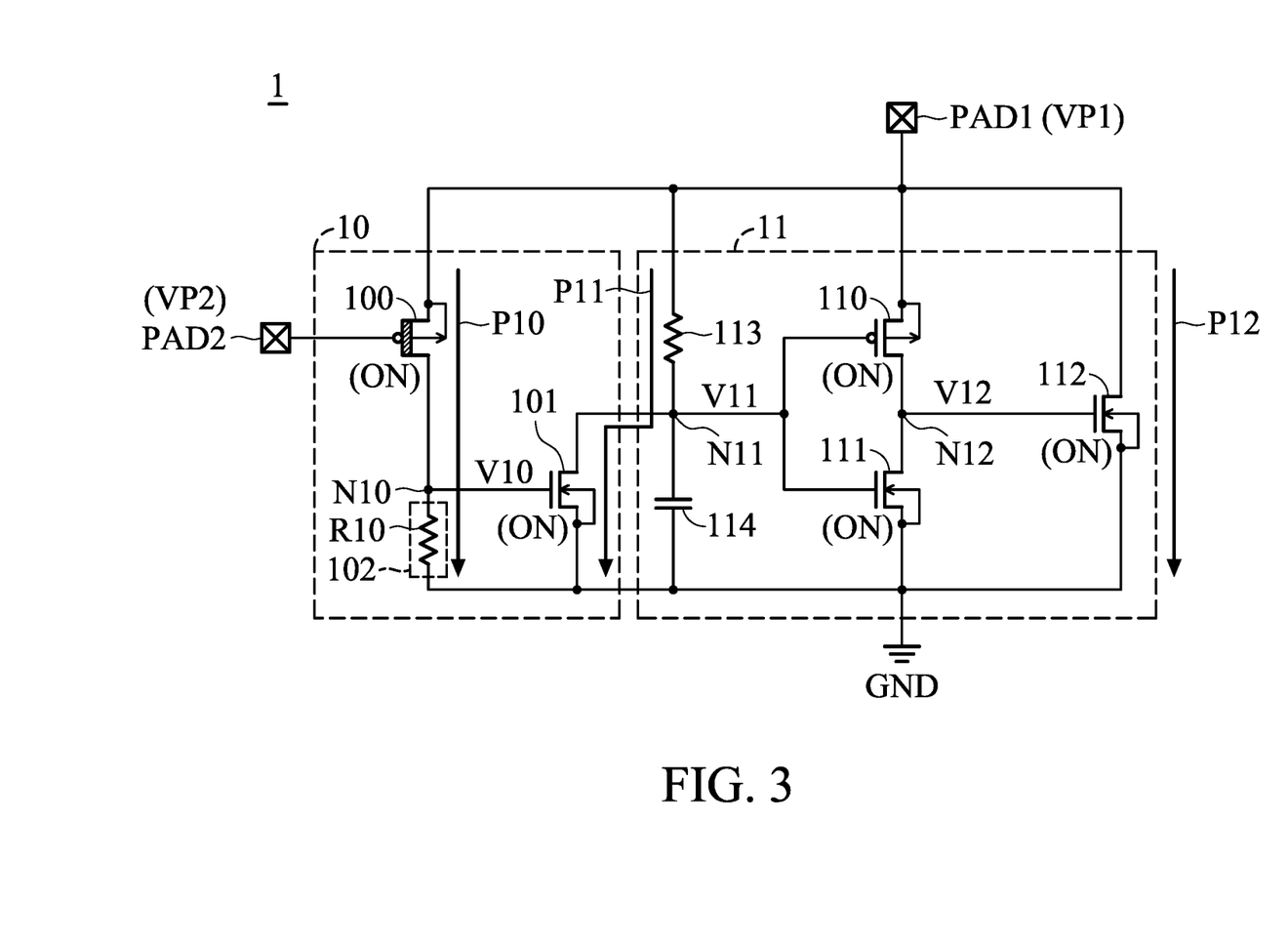
FIG. 3 is a schematic diagram showing an operation of the protection circuit of FIG. 1 when it suffers an electrical overstress event in an operation mode.

During the normal operation, when the power bonding pad PAD1 suffers electrical overstress (that is, an electrical overstress event occurs on the power bonding pad PAD1), the voltage VP1 of the power bonding pad PAD1 increases. Referring to FIGS. 3 and 4, for example, when an electrical overstress event occurs on the power bonding pad PAD1, the voltage VP of the power bonding pad PAD1 increases to 30V. Based on the voltages VP1 and VP2, the PMOS transistor 100 is turned on (ON). Since the PMOS transistor 100 is turned on, a detection path P10 is formed between the power bonding pad PAD1 and the ground terminal GND. That is, the detection circuit 10 activates the detection path P10 through the turned-on state of the PMOS transistor 100. At this time, since the PMOS transistor 100 is turned on, the voltage V10 on the node N10 increases. Referring to FIG. 4, when the voltage VP1 increases to 30V, the voltage V10 also increases. In the embodiment, according to the size of the PMOS transistor 100 and the resistance value of the resistor R10, the level of the voltage V10 after the increase is lower than the detection voltage V11. For example, the voltage V10 is approximately less than or equal to 5V.

In response to the increase the voltage V10, the NMOS transistor 101 is turned on (ON). Since the NMOS transistor 101 is turned on, a discharge path P11 is formed between the power bonding pad PAD1 and the ground terminal GND. That is, the detection circuit 10 activates the discharge path P11 through the turned-on state of the NMOS transistor 101. Through the voltage division operation achieved by the resistor 113 and the turned-on NMOS transistor 101, the detection voltage V11 on the detection node N11 is approximately equal to a predetermined voltage. In the embodiment, the aforementioned predetermined voltage must be lower than the breakdown voltage of the NMOS transistor 111 (for example, 26V). By adjusting the resistance value of the resistor 113 and the size of the NMOS transistor 101, the predetermined voltage can be equal to 18V, that is, the detection voltage V11 is approximately equal to 18V. Referring to FIG. 4, when the voltage VP1 increases to 30V, the detection voltage V11 is approximately equal to 18V (V11≈18V).

In response to the voltage VP1 of 30V and the detection voltage V11 of about 18V, the PMOS transistor 110 is turned on (ON). Moreover, according to the detection voltage V11 of 18V, the NMOS transistor 111 is also turned on (ON). Therefore, the voltage V12 on the node N12 increases through the voltage division operation achieved by the turned-on transistors 110 and 111. Referring to FIG. 4, when the voltage VP increases to 30V, the voltage V12 also increases. In the embodiment, according to the size of the PMOS transistor 110 and the size of the NMOS transistor 111, the level of the voltage V12 after the increase is lower than the detection voltage V11 For example, the voltage V12 is approximately less than or equal to 5V. In response to the detection voltage V12, the NMOS transistor 112 is turned on (ON) to provide a discharge path P12 between the power bonding pad PAD1 and the ground terminal GND.

According to the above description, when an electrical overstress event occurs on the power bonding pad PAD1 in the operation mode, the transistors 100 and 101 of the detection circuit 10 are both turned on, so that the detection path P10 and the discharge path P11 are formed between the power bonding pad PAD1 and the ground terminal GND. The charges on the power bonding pad PAD1 are conducted to the ground terminal GND through the detection path P10 and the discharge path P11. Moreover, due to the existence of the resistor 113 and the NMOS transistor 101, the detection voltage V11 on the detection node N11 is approximately equal to the predetermined voltage, which is not too high to damage the components in the discharge circuit 11, especially the capacitor 114 and the NMOS transistor 111. Further, the NMOS transistor 112 is also turned on. Therefore, when an electrical overstress event occurs on the power bonding pad PAD1, the discharge circuit 11 also provides the discharge path P12 between the power bonding pad PAD1 and the ground terminal GND.

Referring to FIG. 4, when the electrical overstress event disappears, the voltage VP1 of the power bonding pad PAD1 is restored to 24V, and the protection circuit 1 resumes operating normally. At this time, the voltages V10 and V12 decrease to be close to or equal to the voltage level (0V) of the ground terminal GND, and the detection voltage V11 is approximately equal to 18V in response to the voltage VP1.

Figure 5:
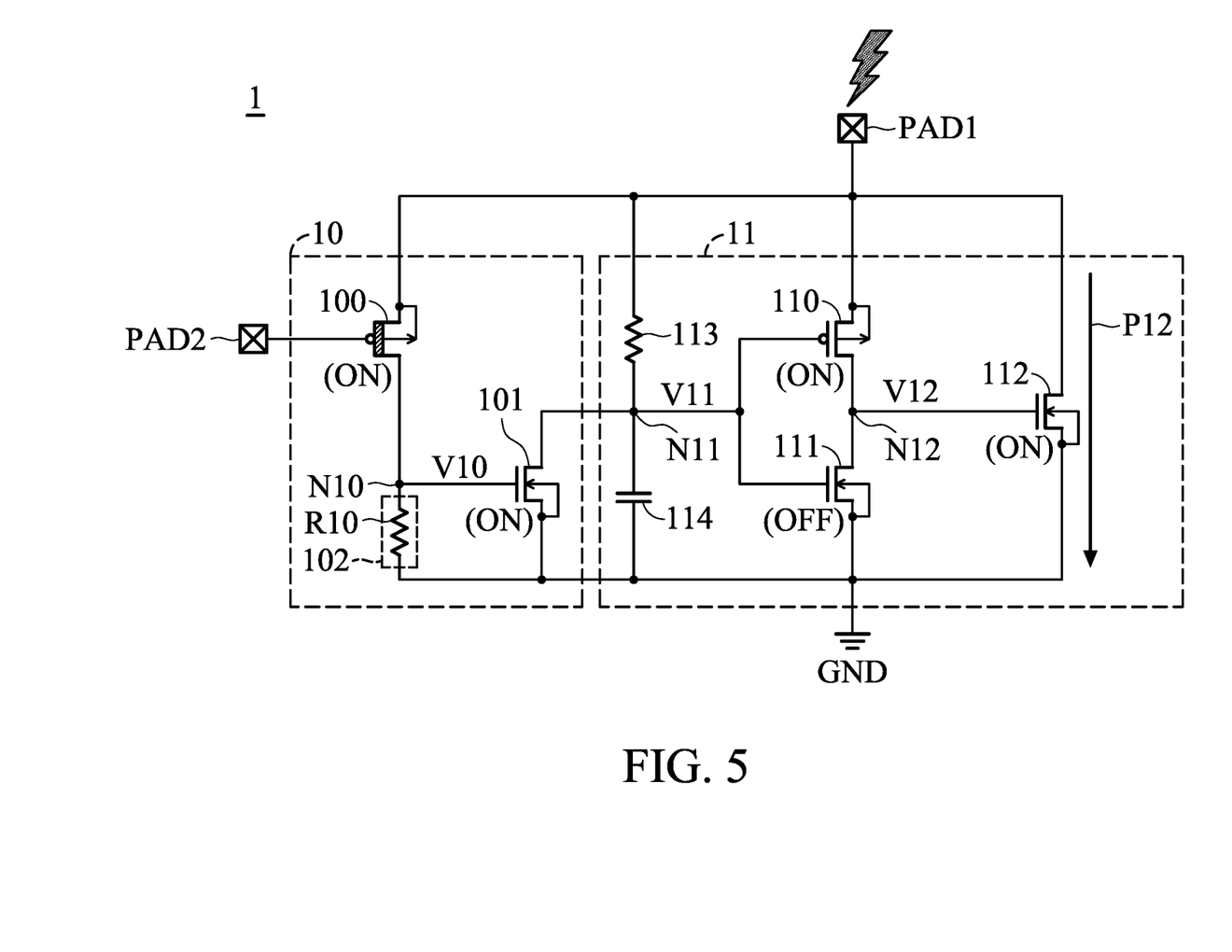
FIG. 5 is a schematic diagram showing an operation of the protection circuit of FIG. 1 when it suffers an electrostatic discharge event.

Referring to FIG. 5, when the protection circuit 1 is not in the operation mode, the operation voltages are not provided to the power bonding pads PAD1 and PAD2. That is, each of the power bonding pads PAD1 and PAD2 is in a floating state, or the voltages VP1 and VP2 of the power bonding pads PAD1 and PAD2 are equal to 0V. When an electrostatic discharge event (for example, a positive electrostatic discharge event) occurs on the power bonding pad PAD1, the voltage VP of the power bonding pad PAD1 increases instantaneously. At this time, since the power bonding pad PAD2 is in a floating state or its voltage VP2 is equal to 0V, the PMOS transistor 100 is turned on (ON). Due to the turned-on state of the PMOS transistor 100, the voltage V10 on the node N10 increases instantaneously with the voltage VP1.

In response to the instant increase in the voltage V10, the NMOS transistor 101 is turned on (ON). Based on the component characteristic of the capacitor 114, the detection voltage V11 does not increase instantaneously with the voltage VP1. Moreover, the detection voltage V11 on the detection node N11 is pulled down through the turned-on NMOS transistor 101. At this time, according to the detection voltage V11, the PMOS transistor 110 is turned on (ON), and the NMOS transistor 111 is turned off (OFF). Through the turned-on PMOS transistor 110, the voltage V12 on the node N12 increases instantaneously with the voltage VP1 to turn on the NMOS transistor 112 (ON). Due to the turned-on state of the NMOS transistor 112, a discharge path P12 is formed between the power bonding pad PAD1 and the ground terminal GND, so that the electrostatic charges on the power bonding pad PAD1 are conducted to the ground terminal GND through the discharge path P12, which protects the components in other circuits coupled to the power bonding pad PAD1 from being damaged by electrostatic charges.

According to the above description, when an electrostatic discharge event occurs on the power bonding pad PAD1, the transistors 100 and 101 of the detection circuit 10 are both turned on, so that the detection voltage V11 can be at a low level (which is close to or equal to the voltage level (0V) of the ground terminal GND), thereby activating the formation of the discharge path P12.

Moreover, compared with an electrostatic discharge protection circuit only comprising the discharge circuit 11 (but not the detection circuit 10), when an electrostatic discharge event occurs on the power bonding pad PAD1, the detection voltage V11 is at a lower level and the voltage V12 is at a higher level based on the operation of the detection circuit 10 of the present invention.

Figure 6A:
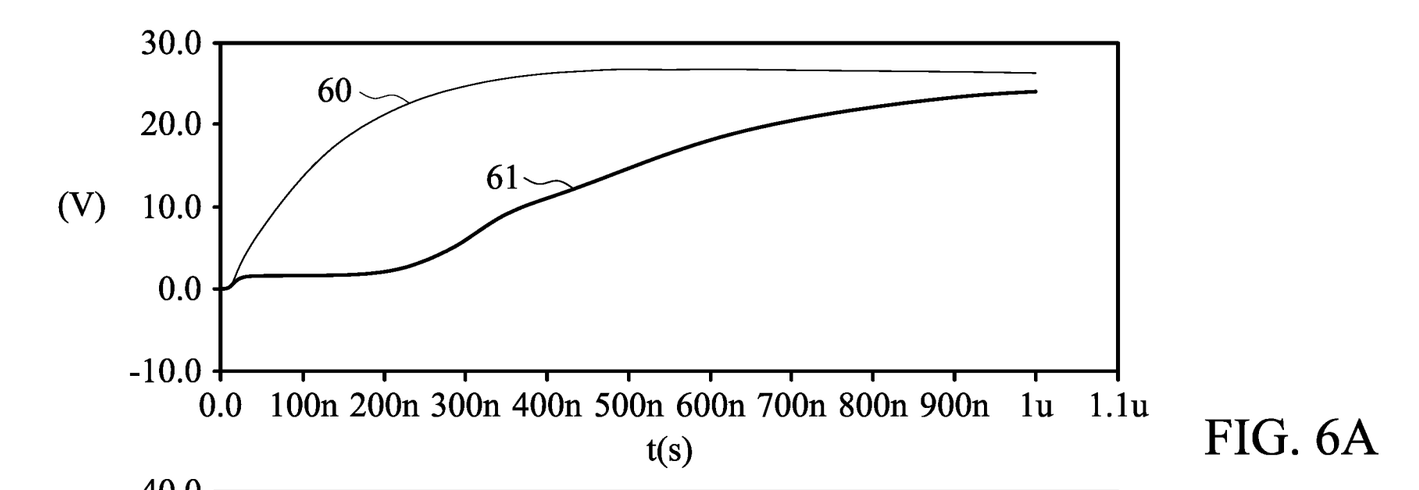
FIGS. 6A-6B are schematic diagrams showing main voltages of the protection circuit of FIG. 1 when it suffers an electrostatic discharge event.
Figure 6B:
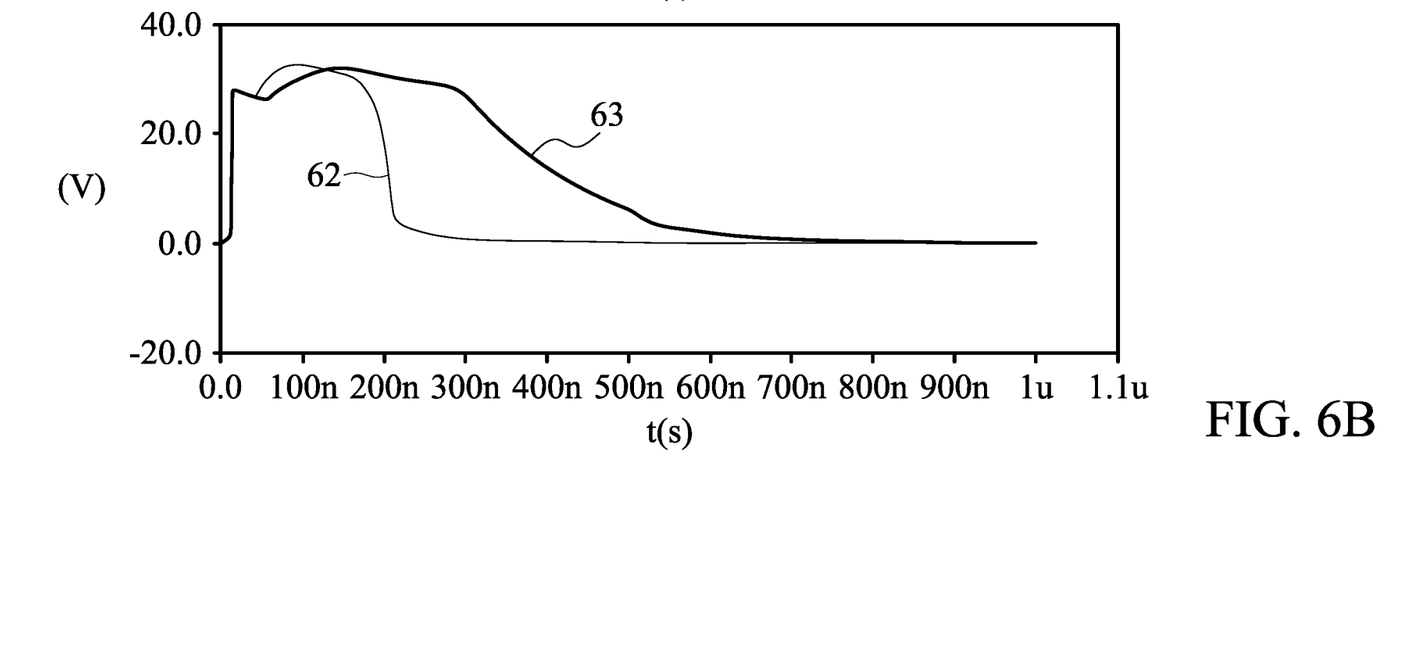

Referring to FIG. 6A~FIG. 6B, when an electrostatic discharge event occurs on the power bonding pad PAD1, the changes in the detection voltage V11 and the voltage V12 of the electrostatic discharge protection circuit with only the discharge circuit 11 are represented by curves 60 and 62, respectively. The changes in the detection voltage V11 and the voltage V12 of the protection circuit 1 of the present invention are represented by curves 61 and 63 respectively. By comparing the curves 60 and 61 and comparing the curves 62 and 63, it can be seen that the level of the detection voltage V11 of the present invention is lower, so that the PMOS transistor 110 can be fully turned on; and the level of the voltage V12 of the present invention is higher, so that the NMOS transistor 112 can be fully turned on. Accordingly, a stable discharge path P12 can be provided.

According to the embodiment shown in FIG. 1, the protection circuit 1 of the present invention can provide not only protection for electrostatic discharge, but also protection for electrical overstress. Due to the protection circuit 1 being coupled to the power bonding pads PAD1 and PAD2 in different power domains, when the detection circuit 10 detects an electrostatic discharge event or an electrical overstress on the power bonding pad PAD1, the transistors 100 and 101 of the detection circuit 10 are in the turned-on state, wherein the turned-on state of the transistors 100 and 101 represents the detection result. According to the detection result, the detection circuit 10 controls the detection node N11 to have different voltages and activates at least one discharge path.

In detail, when the detection circuit 10 detects that an electrical overstress event occurs on the power bonding pad PAD1, the detection circuit 10 controls the detection voltage V11 on the detection node N11 to be at a level (for example, 18V) lower than the breakdown voltage of the NMOS transistor 111 (for example, 26V) and activates the detection path P10 passing through the PMOS transistor 100, the node N10, and the resistor R11, the discharge path P11 passing through the resistor 113, the detection node N11, and the NMOS transistor 101, and the discharge path P12 passing through the NMOS transistor 112 (shown in FIG. 3). When the detection circuit 10 detects that an electrostatic discharge event occurs on the power bonding pad PAD1, the detection circuit 10 controls the detection voltage V11 on the detection node N11 to be at a low level (which is close to or equal to the voltage level (0V) of the ground terminal GND) and activates the discharge path P12 passing through the NMOS transistor 112 (shown in FIG. 5).

According to the related description of FIG. 5, the capacitor 114 is used to prevent the detection voltage V11 from increasing instantaneously with the voltage VP1 and cause the detection voltage to be at a low level when an electrostatic discharge event occurs on the power bonding pad PAD1. According to the operation of the detection circuit 10 of the present invention, when an electrostatic discharge event occurs, the detection circuit 10 can pull down the detection voltage V11, that is, the detection voltage V11 does not increase instantaneously along with the voltage VP1. Therefore, in other embodiments, the capacitor 114 may be omitted.

Figure 7:
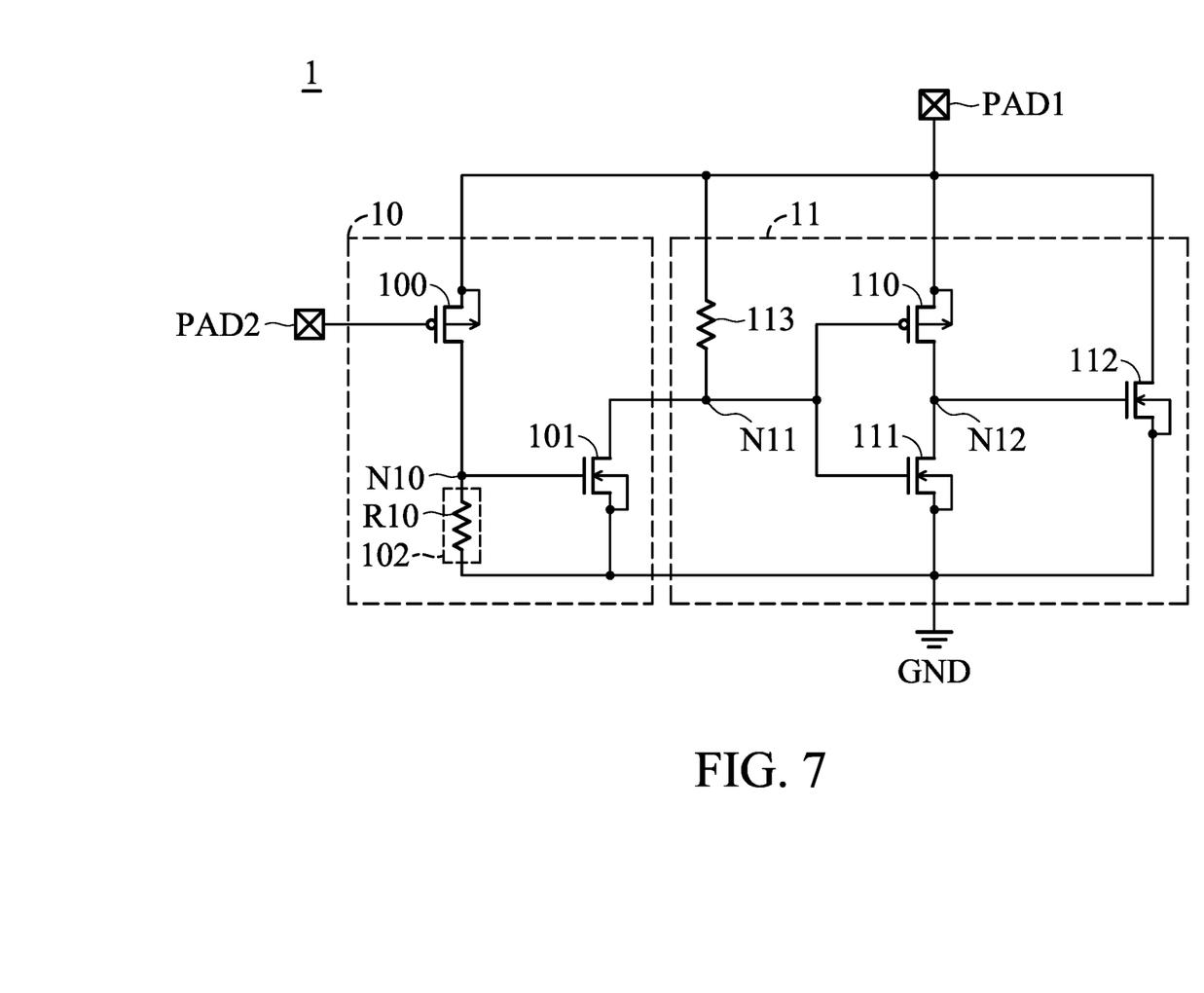
FIG. 7 shows another exemplary embodiment of a protection circuit.

Referring to FIG. 7, the discharge circuit 11 does not comprise the capacitor 114, which can reduce the area of the protection circuit 1. Even if the discharge circuit 11 does not comprise the capacitor 114, due to the operation of the detection circuit 10, the detection voltage V11 can still be at a low level when an electrostatic discharge event occurs. For the operation of the protection circuit 1 shown in FIG. 7, please refer to the related descriptions in FIGS. 1-6A. The description related to the operation of the protection circuit 1 shown in FIG. 7 is omitted here.

In the above embodiments, the resistive element 102 is implemented by the resistor R10. In other embodiments, the resistive element 102 may be implemented by another element that can provide impedance.

Figure 8:
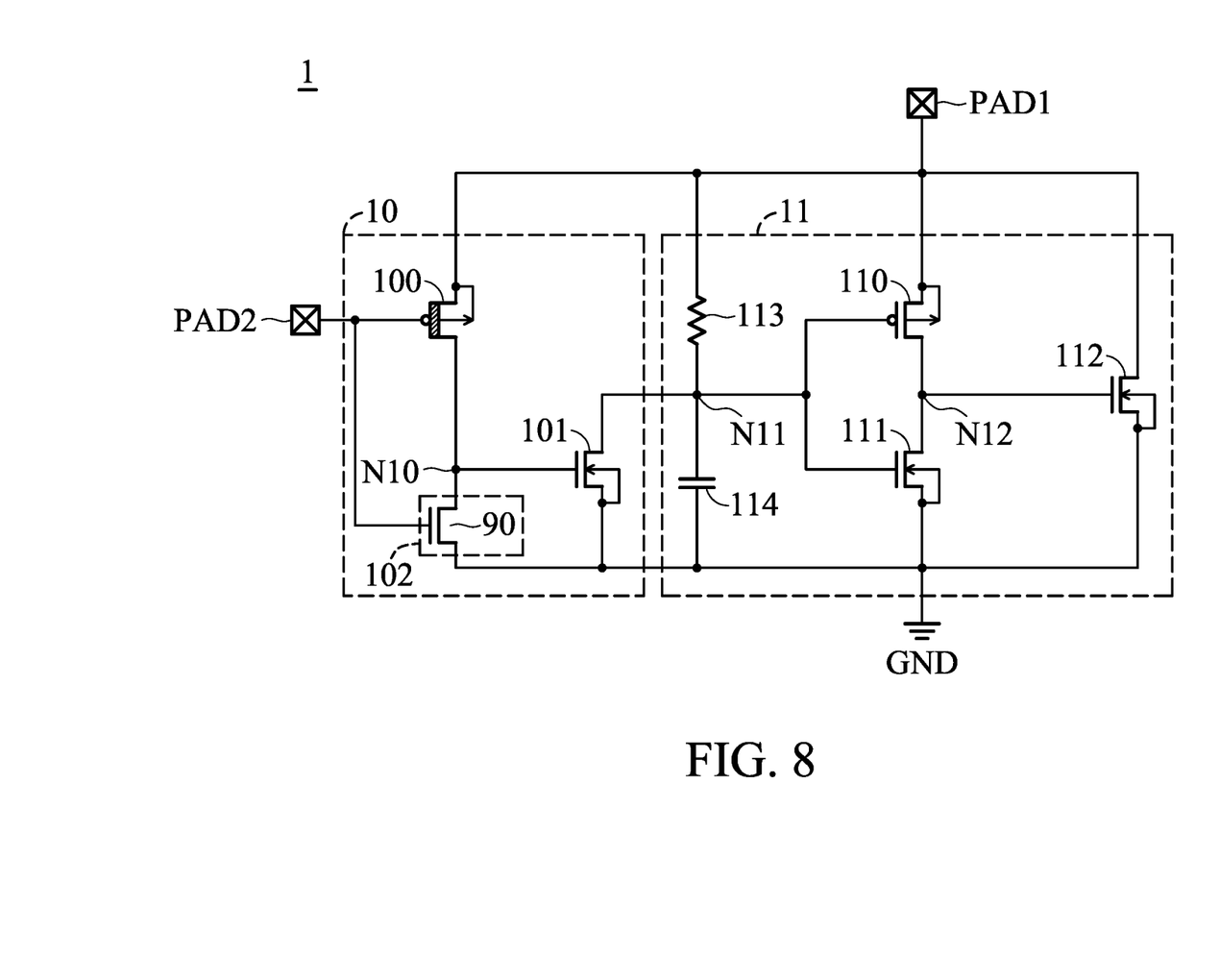
FIG. 8 shows further another exemplary embodiment of a protection circuit.
Figure 9:
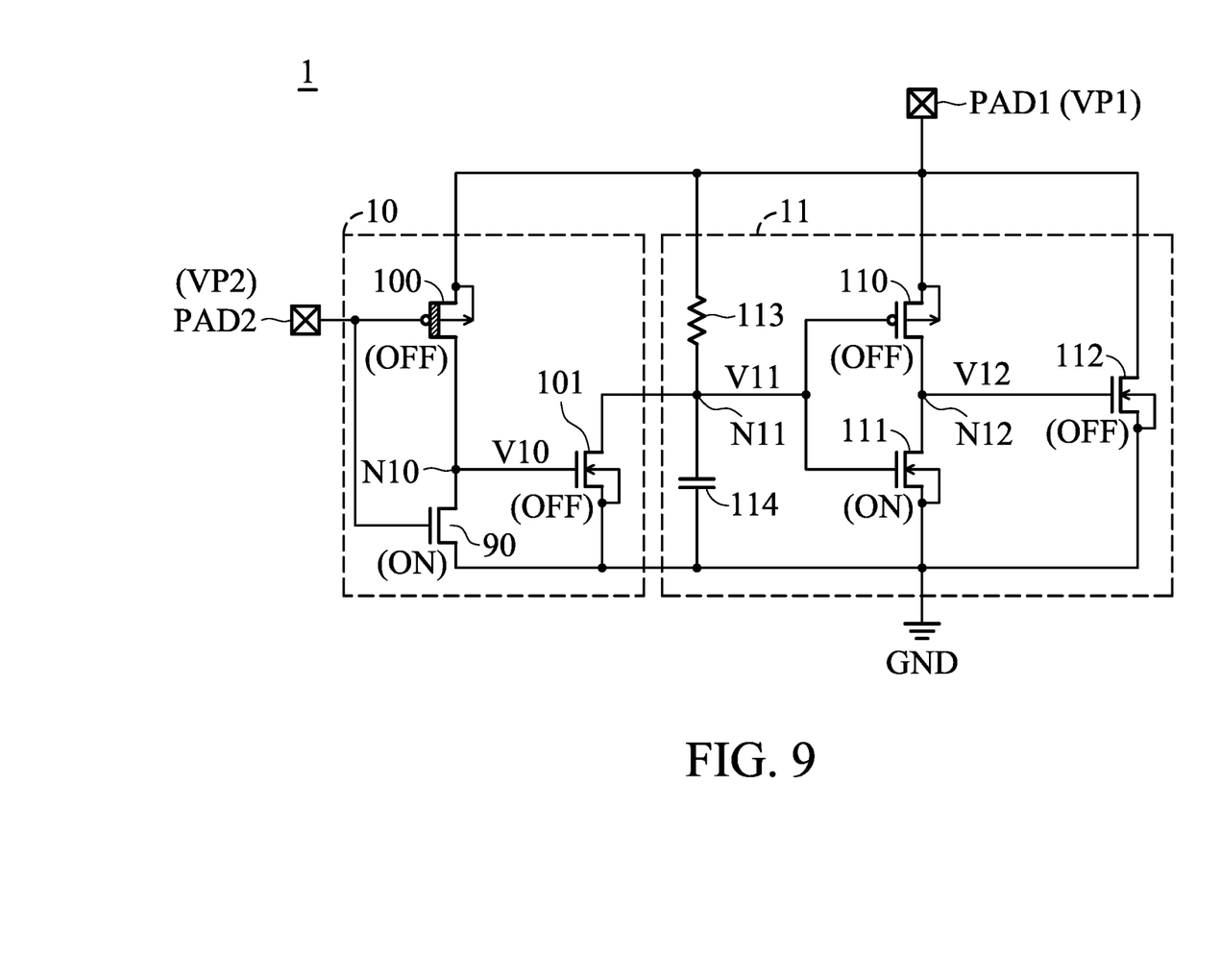
FIG. 9 is a schematic diagram showing a normal operation of the protection circuit of FIG. 8 in an operation mode.

Referring to FIG. 8, the resistive element 102 comprises an NMOS transistor 90. The first terminal of the NMOS transistor 90 is coupled to the node N10, the second terminal thereof is coupled to the ground terminal GND, and the control terminal thereof is coupled to the power bonding pad PAD2. For the connection structure of the other components of the protection circuit 1 shown in FIG. 8, please refer to the related description in FIG. 1. The description related to the connection structure of the protection circuit 1 shown in FIG. 8 is omitted here. Referring to FIG. 9, when the protection circuit 1 operates normally in an operation mode, an operation voltage is provided to the power bonding pad PAD1, another operation voltage is provided to the power bonding pad PAD2, and there is a ground voltage (for example, 0V (V)) on the ground terminal GND. For example, the operation voltage provided to the power bonding pad PAD1 is 18V, and the operation voltage provided to the power bonding pad PAD2 is 24V. Therefore, the voltage VP1 of the power bonding pad PAD1 is 18V, and the voltage VP2 of the power bonding pad PAD2 is 24V.

Based on the voltages VP1 and VP2, the PMOS transistor 100 is turned off (OFF). Moreover, in response to the voltage VP2, the NMOS transistor 90 is turned on (ON). At this time, the voltage V10 on the node N10 is pulled down approximately to the voltage level (0V) of the ground terminal GND through the turned-on NMOS transistor 90, so that the NMOS transistor 101 is turned off (OFF). In addition, in response to the voltage VP1, the detection voltage V11 on the detection node N11 is approximately equal to the voltage VP1. For example, the detection voltage V11 is approximately equal to 18V. According to the detection voltage V11, the PMOS transistor 110 is turned off (OFF), and the NMOS transistor 111 is turned on (ON). Through the turned-on NMOS transistor 111, the voltage V12 on the node N12 is close to or equal to the voltage level (0V) of the ground terminal GND, so that the NMOS transistor 112 is turned off (OFF).

According to the above description, when the protection circuit 1 operates normally in the operation mode, the transistors 100 and 101 of the detection circuit 10 are turned off, and the transistors 110 and 112 of the discharge circuit 11 are also turned off. Therefore, the detection circuit 10 does not provide any circuit path between the power bonding pad PAD1 and the ground terminal GND, and the discharging circuit 11 also does not provide any circuit path between the power bonding pad PAD1 and the ground terminal GND.

Figure 10:
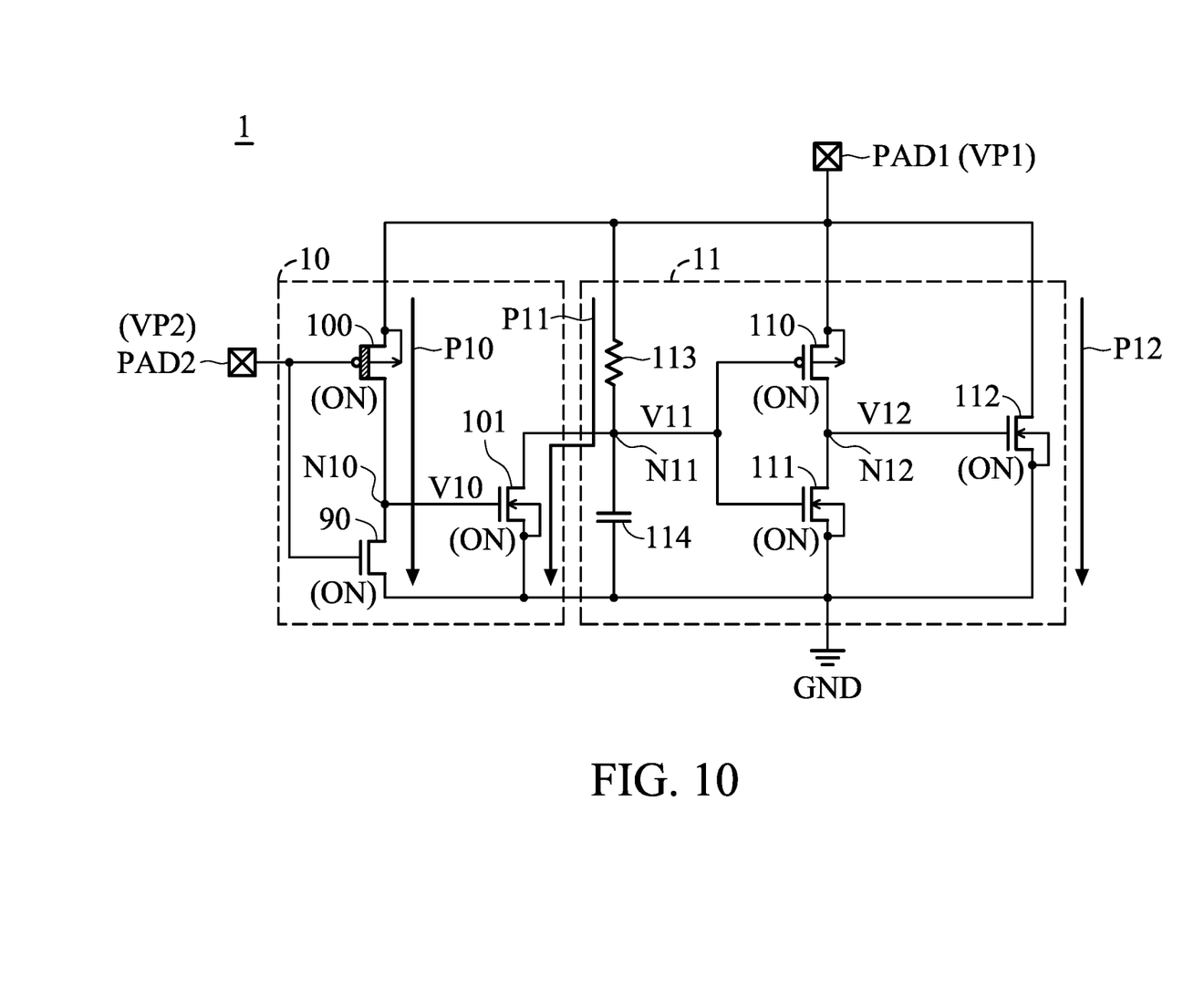
FIG. 10 is a schematic diagram showing an operation of the protection circuit of FIG. 8 when it suffers an electrical overstress event in an operation mode.

Referring to FIG. 10, during normal operation, when an electrical overstress event occurs on the power bonding pad PAD1, the voltage VP1 of the power bonding pad PAD1 increases to, for example, 30V. Based on the voltages VP1 and VP2, the PMOS transistor 100 is turned on (ON). In addition, in response to the voltage VP2, the NMOS transistor 90 is turned on (ON). Since the PMOS transistor 100 and the NMOS transistor 90 are both turned on, a detection path P10 is formed between the power bonding pad PAD1 and the ground terminal GND. That is, the detection circuit 10 activates the detection path P10 through the turned-on state of the PMOS transistor 100. The detection path P10 passes through the PMOS transistor 100, the node N10, and the NMOS transistor 90. At this time, the voltage V10 on the node N10 increases to turn on the NMOS transistor 101 (ON) through the voltage division operation achieved by the turned-on PMOS transistor 100 and the turned-on NMOS transistor 90.

Since the NMOS transistor 101 is turned on, a discharge path P11 is formed between the power bonding pad PAD1 and the ground terminal GND. That is, the detection circuit 10 activates the discharge path P11 through the turned-on state of the NMOS transistor 101. The discharge path P11 passes through the resistor 113, the detection node N11, and the NMOS transistor 101. Through the voltage division operation achieved by the resistor 113 and the turned-on NMOS transistor 101, the detection voltage V11 is approximately equal to a predetermined voltage. By adjusting the resistance value of the resistor 113 and the size of the NMOS transistor 101, the predetermined voltage can be equal to 18V which is lower than the breakdown voltage of the NMOS transistor 111 (for example, 26V). In response to the voltage VP1 of 30V and the detection voltage V11 of about 18V, the PMOS transistor 110 is turned on (ON). Moreover, according to the detection voltage V11 of 18V, the NMOS transistor 111 is also turned on (ON). Therefore, the voltage V12 on the node N12 increases through the voltage division operation achieved by the turned-on transistors 110 and 111, so that the NMOS transistor 112 is turned on (ON) to provide a discharge path P12 between the power bonding pad PAD1 and the ground terminal GND.

According to the above, when an electrical overstress event occurs in the power bonding pad PAD1 in the operation mode, the transistors 100, 101, and 90 of the detection circuit 10 are all turned on, so that the detection path P10 and the discharge path P11 are formed between the power bonding pad PAD1 and the ground terminal GND. The charges on the power bonding pad PAD1 are conducted to the ground terminal GND through the detection path P10 and the discharge path P11. Moreover, due to the existence of the resistor 113 and the NMOS transistor 101, the detection voltage V11 on the detection node N11 is approximately equal to the predetermined voltage, which is not too high to damage the components in the discharge circuit 11, especially the capacitor 114 and the NMOS transistor 111. Further, the NMOS transistor 112 is also turned on. Therefore, when an electrical overstress event occurs on the power bonding pad PAD1, the discharge circuit 11 also provides the discharge path P12 between the power bonding pad PAD1 and the ground terminal GND.

Figure 11:
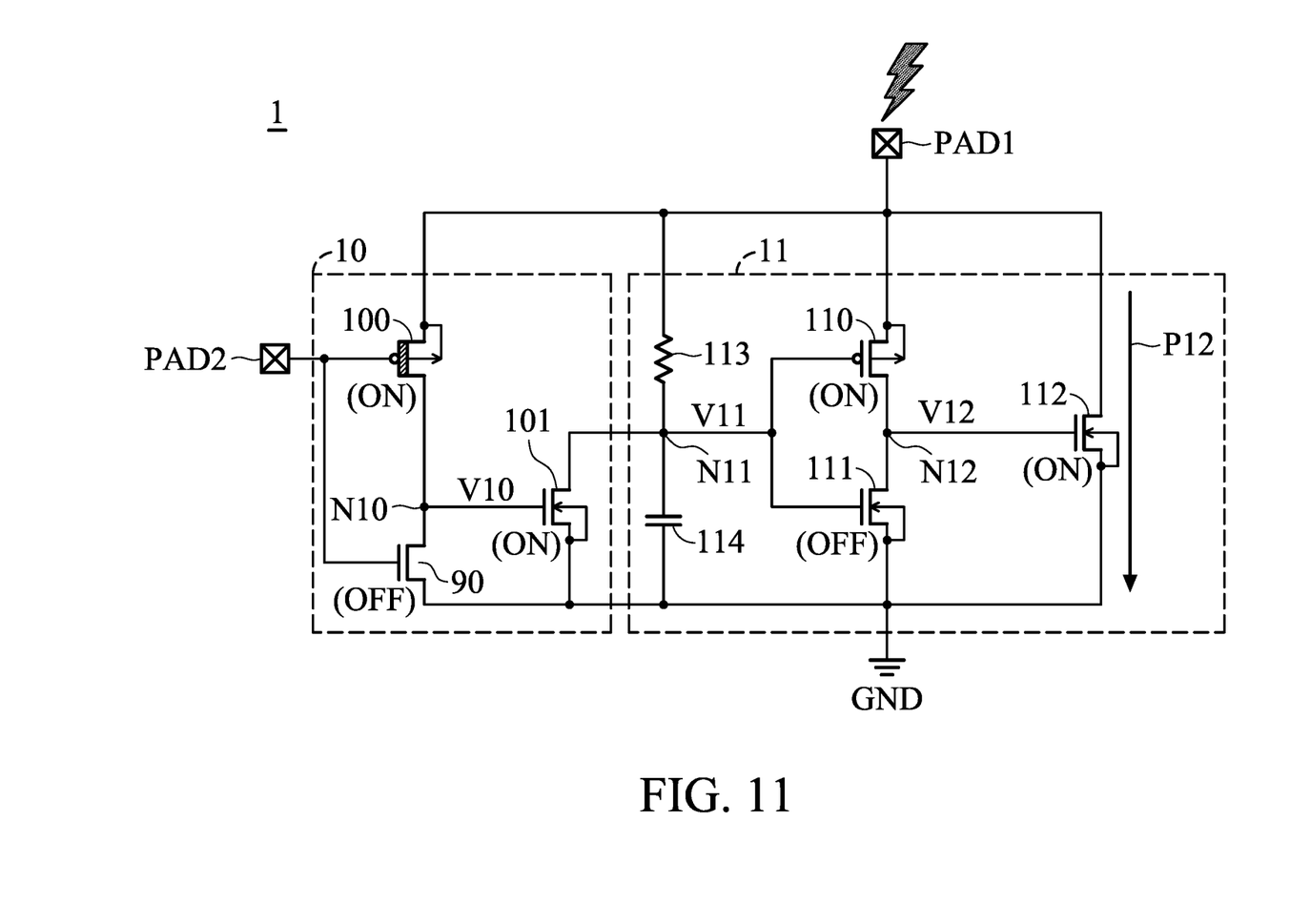
FIG. 11 is a schematic diagram showing an operation of the protection circuit of FIG. 1 when it suffers an electrostatic discharge event.

Referring to FIG. 11, when the protection circuit 1 is not in the operation mode, the operation voltages are not provided to the power bonding pads PAD1 and PAD2. That is, each of the power bonding pads PAD1 and PAD2 is in a floating state, or the voltages VP1 and VP2 of the power bonding pads PAD1 and PAD2 are equal to 0V. When an electrostatic discharge event occurs on the power bonding pad PAD1, the voltage VP of the power bonding pad PAD1 increases instantly. At this time, since the power bonding pad PAD2 is in a floating state or its voltage VP2 is equal to 0V, the PMOS transistor 100 is turned on (ON), and the NMOS transistor 90 is turned off (OFF). Through the turned-on PMOS transistor 100, the voltage V10 on the node N10 increases instantaneously with the voltage VP1.

In response to the instant increase of the voltage V10, the NMOS transistor 101 is turned on (ON). Based on the component characteristic of the capacitor 114, the detection voltage V11 does not increase instantaneously with the voltage VP1. Moreover, the detection voltage V11 on the detection node N11 is pulled down through the turned-on NMOS transistor 101. At this time, according to the detection voltage V11, the PMOS transistor 110 is turned on (ON), and the NMOS transistor 111 is turned off (OFF). Through the turned-on PMOS transistor 110, the voltage V12 on the node N12 increases instantaneously with the voltage VP1 to turn on the NMOS transistor 112 (ON). Due to the turned-on state of the NMOS transistor 112, a discharge path P12 is formed between the power bonding pad PAD1 and the ground terminal GND, so that the electrostatic charges on the power bonding pad PAD1 are conducted to the ground terminal GND through the discharge path P12, which protects the components in other circuits coupled to the power bonding pad PAD1 from being damaged by electrostatic charges.

According to the above, when an electrostatic discharge event occurs on the power bonding pad PAD1, the transistors 100 and 101 of the detection circuit 10 are both turned on, and the transistor 90 is turned off, so that the detection voltage V11 can be at a low level (which is close to or equal to the voltage level (0V) of the ground terminal GND), thereby activating the formation of the discharge path P12.

According to the above description, the protection circuit 1 of FIG. 8 can provide not only protection for electrostatic discharge, but also protection for electrical overstress. Due to the protection circuit 1 being coupled to the power bonding pads PAD1 and PAD2 in different power domains, when the detection circuit 10 detects an electrostatic discharge event or an electrical overstress on the power bonding pad PAD1, the transistors 100 and 101 in the detection circuit 10 are in the turned-on state, wherein the turned-on state of the transistors 100 and 101 represents the detection result. According to the detection result, the detection circuit 10 controls the detection node N11 to have different voltages and activates at least one discharge path.

In detail, when the detection circuit 10 detects that an electrical overstress event occurs on the power bonding pad PAD1, the detection circuit 10 controls the detection voltage V11 on the detection node N11 to be at a level (for example, 18V) lower than the breakdown voltage of the NMOS transistor 111 (for example, 26V) and activates the detection path P10 passing through the PMOS transistor 100, the node N10, and the NMOS transistor 90, the discharge path P11 passing through the resistor 113, the detection node N11, and the NMOS transistor 101, and the discharge path P12 passing through the NMOS transistor 112 (shown in FIG. 10). When the detection circuit 10 detects that an electrostatic discharge event occurs on the power bonding pad PAD1, the detection circuit 10 controls the detection voltage V11 on the detection node N11 to be at a low level (which is close to or equal to the voltage level (0V) of the ground terminal GND) and activates the discharge path P12 passing through the NMOS transistor 112 (shown in FIG. 11).

In the embodiment of FIG. 8, the thickness of the gate oxide layer of the PMOS transistor 100 is preferably greater than the thickness of the gate oxide layer of the PMOS transistor 110, but the present invention is not limited to this. In other embodiments based on the circuit structure of FIG. 8, the thickness of the gate oxide layer of the PMOS transistor 100 may be equal to or less than the thickness of the gate oxide layer of the PMOS transistor 110.

Moreover, in the embodiment of FIG. 8, the discharge circuit 11 may not comprise the capacitor 114, so that the protection circuit 1 occupies a smaller area. Even if the discharge circuit 11 does not comprise the capacitor 114, due to the operation of the detection circuit 10, the detection voltage V11 can still be at a low level through the turned-on NMOS transistor 101 to activate the formation of the discharge path P12 when an electrostatic discharge event occurs.

In the above embodiments, when the protection circuit 1 enters the operation mode, two different operation voltages can be simultaneously provided to the power bonding pad PAD1 and the power bonding pad PAD2. In other embodiments, when the protection circuit 1 enters the operation mode, two different operation voltages can be provided to the power bonding pads PAD1 and PAD2 in sequence. For example, an operation voltage is provided to the power bonding pad PAD2 first, and then another operation voltage is provided to the power bonding pad PAD1. Accordingly, when the protection circuit 1 enters the operation mode, the voltage VP2 of the power bonding pad PAD2 is at a high level for the first time to turn off the PMOS transistor 100, thereby avoiding leakage current passing through the PMOS transistor 100.

While the invention has been described by way of examples and preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A protection circuit having a first power bonding pad and a second power bonding pad, comprising:
    a detection circuit coupled to the first power bonding pad and the second power bonding pad and configured to detect whether an electrostatic discharge event or an electrical overstress event occurs on the first power bonding pad and control a detection voltage on a detection node according to a detection result, wherein the first power bonding pad and the second power bonding pad belong to different respective power domains; and
    a discharge circuit coupled to the detection node and the first power bonding pad,
    wherein, in response to the electrostatic discharge event occurring on the first power bonding pad, the discharge circuit provides a first discharge path between the first power bonding pad and a ground terminal according to the detection voltage, and
    wherein, in response to the electrical overstress event occurring on the first power bonding pad, the detection circuit activates a second discharge path between the first power bonding pad and the ground terminal.

2. The protection circuit as claimed in claim 1, wherein in response to the electrical overstress event occurring on the first power bonding pad, the discharge circuit provides the first discharge path according to the detection voltage.

3. The protection circuit as claimed in claim 1, wherein:
    when the protection circuit is in a normal operation mode, the first power bonding pad receives a first voltage, and the second power bonding pad receives a second voltage, and
    the second voltage is greater than or equal to the first voltage.

4. The protection circuit as claimed in claim 3, wherein a time point when the second voltage is supplied to the second power bonding pad is earlier than a time point when the first voltage is supplied to the first power bonding pad.

5. The protection circuit as claimed in claim 3, wherein when the protection circuit is not in the operation mode, the first power bonding pad does not receive the first voltage, and the second power bonding pad is floating or receives a voltage of 0 volts.

6. The protection circuit as claimed in claim 1, wherein the detection circuit comprises:
    a first transistor having a first terminal coupled to the first power bonding pad, a second terminal coupled to a first node, and a control terminal coupled to the second power bonding pad;
    a resistive element coupled between the first node and the ground terminal; and
    a second transistor having a first terminal coupled to the detection node, a second terminal coupled to the ground terminal, and a control terminal coupled to the first node.

7. The protection circuit as claimed in claim 6, wherein:
    the discharge circuit comprises a resistor coupled between the first power bonding pad and the detection node, and
    in response to the electrical overstress event occurring on the first power bonding pad, the second discharge path passes through the resistor, the detection node, and the second transistor.

8. The protection circuit as claimed in claim 7, wherein in response to the electrical overstress event occurring on the first power bonding pad, the detection circuit further activates a detection path between the first power bonding pad and the ground terminal, and the detection path passes through the first transistor, the first node, and the resistive element.

9. The protection circuit as claimed in claim 6, wherein the resistive element comprises a resistor.

10. The protection circuit as claimed in claim 6, wherein the resistive element comprises a third transistor, and the third transistor has a first terminal coupled to the first node, a second terminal coupled to the ground terminal, and a control terminal coupled to the second power bonding pad.

11. A protection circuit comprising:
    a detection circuit comprising:
        a first transistor having a first terminal coupled to a first power bonding pad, a second terminal coupled to a first node, and a control terminal coupled to a second power bonding pad, wherein the first power bonding pad and the second power bonding pad belong to different respective power domains;
        a resistive element coupled between the first node and a ground terminal; and
        a second transistor having a first terminal coupled to a detection node, a second terminal coupled to the ground terminal, and a control terminal coupled to the first node; and
    a discharge circuit, coupled to the detection node and the first power bonding pad, comprising:
        a resistor coupled between the first power bonding pad and the detection node;
        a third transistor having a first terminal coupled to the first power bonding pad, a second terminal coupled to a second node, and a control terminal coupled to the detection node;
        a fourth transistor having a first terminal coupled to the second node, a second terminal coupled to the ground terminal, and a control terminal coupled to the detection node; and
        a fifth transistor having a first terminal coupled to the first power bonding pad, a second terminal coupled to the ground terminal, and a control terminal coupled to the second node.

12. The protection circuit as claimed in claim 11, wherein:
    in response to an electrostatic discharge event occurring on the first power bonding pad, the fifth transistor is turned on, and
    in an operation mode of the protection circuit, in response to an electrical overstress event occurring on the first power bonding pad, the first transistor and the second transistor are turned on.

13. The protection circuit as claimed in claim 12, wherein in response to the electrical overstress event occurring on the first power bonding pad, the fifth transistor is turned on.

14. The protection circuit as claimed in claim 12, wherein:
    when the protection circuit is in the operation mode, the first power bonding pad receives a first voltage, and the second power bonding pad receives a second voltage, and
    the second voltage is greater than or equal to the first voltage.

15. The protection circuit as claimed in claim 14, wherein a time point when the second voltage is supplied to the second power bonding pad is earlier than a time point when the first voltage is supplied to the first power bonding pad.

16. The protection circuit as claimed in claim 14, wherein when the protection circuit is not in the operation mode, the first power bonding pad does not receive the first voltage, and the second power bonding pad is floating or receives a voltage of 0 volts.

17. The protection circuit as claimed in claim 11, wherein the discharge circuit further comprises:
   a capacitor coupled between the detection node and the ground terminal.

18. The protection circuit as claimed in claim 11, wherein thickness of a gate oxide layer of the first transistor 100 is greater than thickness of a gate oxide layer of the third transistor.

19. The protection circuit as claimed in claim 11, wherein the resistive element comprises a resistor.

20. The protection circuit as claimed in claim 11, wherein the resistive element comprises a sixth transistor, and the sixth transistor has a first terminal coupled to the first node, a second terminal coupled to the ground terminal, and a control terminal coupled to the second power bonding pad.

\* \* \* \* \*